US012775576B2

(12) United States Patent
Zhang

(10) Patent No.: US 12,775,576 B2
(45) Date of Patent: Oct. 27, 2026

(54) DATA TRANSMISSION METHOD AND APPARATUS

(71) Applicant: Horizon Journey (Shanghai) Technology Co., Ltd., Shanghai (CN)

(72) Inventor: Bin Zhang, Shanghai (CN)

(73) Assignee: Horizon Journey (Shanghai) Technology Co., Ltd., Shanghai (CN)

( * ) Notice: Subject to any disclaimer, the term of this patent is extended or adjusted under 35 U.S.C. 154(b) by 23 days.

(21) Appl. No.: 18/860,194

(22) PCT Filed: Apr. 11, 2023

(86) PCT No.: PCT/CN2023/087455
§ 371 (c)(1),
(2) Date: Oct. 25, 2024

(87) PCT Pub. No.: WO2023/207571
PCT Pub. Date: Nov. 2, 2023

(65) Prior Publication Data
US 2025/0291664 A1 Sep. 18, 2025

(30) Foreign Application Priority Data
Apr. 26, 2022 (CN) ........................ 202210451683.7

(51) Int. Cl.
*G06F 13/42* (2006.01)

(52) U.S. Cl.
CPC ................................ *G06F 13/4273* (2013.01)

(58) Field of Classification Search
CPC .................................................. G06F 13/4273
See application file for complete search history.

(56) References Cited

U.S. PATENT DOCUMENTS 10,142,972 B2 * 11/2018 Merlin .................. H04W 72/04
11,287,134 B2 3/2022 Berry
(Continued)

FOREIGN PATENT DOCUMENTS

CN 102890663 A 1/2013
CN 104883391 A * 9/2015 ............ H04L 67/06
(Continued)

OTHER PUBLICATIONS

English translation of CN-104883391-A (Year: 2015).*
(Continued)

*Primary Examiner* — Henry Tsai
*Assistant Examiner* — John B Roche
(74) *Attorney, Agent, or Firm* — K&L Gates LLP

(57) ABSTRACT

Disclosed are a data transmission method and apparatus. The method comprises: first determining a transmission duration required for transmitting data to be transmitted between a first processing unit and a second processing unit; starting timing when it is detected that the data is transmitted from the first processing unit; and then, determining a physical parameter of the first processing unit when transmitting the data based on timing duration and a transmission status of the data; and transmitting the data to the second processing unit based on the physical parameter. According to this method, when there is a transmission delay in the data, the physical parameter of the first processing unit when transmitting the data can be adjusted, and the data can be transmitted to the second processing unit based on the adjusted physical parameter.

20 Claims, 5 Drawing Sheets

(56) References Cited

U.S. PATENT DOCUMENTS

| | | | | |
|---|---|---|---|---|
| 2009/0310499 | A1 | 12/2009 | Perraud et al. | |
| 2012/0182589 | A1 | 7/2012 | Komori | |
| 2012/0198266 | A1 | 8/2012 | Hofmann et al. | |
| 2016/0239448 | A1* | 8/2016 | Maletsky | G06F 13/4068 |
| 2018/0249484 | A1 | 8/2018 | Kim et al. | |
| 2019/0098544 | A1 | 3/2019 | Han et al. | |
| 2019/0131975 | A1* | 5/2019 | Raghava | H04L 41/5019 |
| 2021/0135917 | A1* | 5/2021 | Kim | H04L 27/2605 |

FOREIGN PATENT DOCUMENTS

| | | | | |
|---|---|---|---|---|
| CN | 107102822 | A | 8/2017 | |
| CN | 109039453 | A | 12/2018 | |
| CN | 112152759 | A | * 12/2020 | H04L 67/06 |
| CN | 114095445 | A | 2/2022 | |
| CN | 114143270 | A | 3/2022 | |
| CN | 114817110 | A | 7/2022 | |
| JP | 2013046734 | A | 3/2013 | |
| JP | 2021002187 | A | 1/2021 | |
| WO | 2018028471 | A1 | 2/2018 | |
| WO | 2023207571 | A1 | 11/2023 | |

OTHER PUBLICATIONS

English translation of CN-112152759-A (Year: 2020).*

Translation of CN-104883391-A (Year: 2015).*

Translation of CN-112152759-A (Year: 2020).*

International Search Report and Written Opinion for corresponding International PCT Application No. PCT/CN2023/087455, dated Aug. 3, 2023.

Notification on grant of patent right for invention for corresponding Chinese Patent Application No. 202210451683.7 issued Mar. 31, 2023.

The First Japanese Office Action from corresponding Japanese patent application No. 2024-563129, mailed on Nov. 25, 2025 and its English translation.

European Search Report from the corresponding European Patent Application No. 23795004.3, mailed on Mar. 20, 2026.

* cited by examiner

DATA TRANSMISSION METHOD AND APPARATUS

CROSS-REFERENCE TO RELATED APPLICATIONS

This application is a U.S. National Stage Entry under 35 U.S.C. § 371 of International Patent Application No. PCT/CN2023/087455, entitled DATA TRANSMISSION METHOD AND APPARATUS, filed Apr. 11, 2023, which claims priority to Chinese patent application No. 202210451683.7, filed on Apr. 26, 2022 and entitled DATA TRANSMISSION METHOD AND APPARATUS, the entire disclosures of which are hereby incorporated by reference herein.

FIELD OF THE INVENTION

This disclosure relates to the technical field of chip diagnosis, and in particular, to a data transmission method and an apparatus.

BACKGROUND OF THE INVENTION

In a system on chip (SoC), multiple intellectual property cores (IP cores) are typically disposed, and data may be transmitted between IP cores in a same SoC and between IP cores in different SoCs.

SUMMARY OF THE INVENTION

At present, there may be a transmission delay in a process of data transmission, that is, an IP core that needs to obtain data cannot obtain the data in a timely manner. The transmission delay may generally cause functional abnormalities (such as IP core hanging) to the IP core, and may even cause a SoC failure.

To resolve the foregoing technical problem, this disclosure provides a data transmission method and an apparatus to reduce a possibility of data transmission delays and improve reliability of data transmission.

According to a first aspect of this disclosure, a data transmission method is provided, including: first, determining transmission duration required for transmitting data to be transmitted between a first processing unit and a second processing unit; and then, starting timing when it is detected that the data to be transmitted is transmitted from the first processing unit; further, determining, based on timing duration and a transmission status of the data to be transmitted, a physical parameter of the first processing unit when transmitting the data to be transmitted; and finally, transmitting the data to be transmitted to the second processing unit based on the physical parameter.

According to a second aspect of this disclosure, a data transmission apparatus is provided, including: a duration determining module, configured to determine transmission duration required for transmitting data to be transmitted between a first processing unit and a second processing unit; a timing start module, configured to start timing when it is detected that the data to be transmitted is transmitted from the first processing unit; a parameter determining module, configured to determine, based on timing duration determined by the timing start module and a transmission status of the data to be transmitted, a physical parameter of the first processing unit when transmitting the data to be transmitted; and a data transmission module, configured to transmit the data to be transmitted to the second processing unit based on the physical parameter determined by the parameter determining module.

According to a third aspect of this disclosure, a computer readable storage medium is provided. The storage medium stores a computer program thereon, wherein the computer program is used for implementing the data transmission method provided in the embodiment in the first aspect of this disclosure.

According to a fourth aspect of this disclosure, an electronic device is provided. The electronic device includes: a processor; and a memory, configured to store processor-executable instructions. The processor is configured to read the executable instructions from the memory, and execute the instructions to implement the data transmission method provided in the embodiment in the first aspect of this disclosure.

According to the solutions provided in the embodiments of this disclosure, when there is a transmission delay in a process of transmitting the data to be transmitted, the physical parameter of the first processing unit when transmitting the data to be transmitted can be adjusted, and the data to be transmitted can be transmitted to the second processing unit based on the adjusted physical parameter. That is, according to the solutions provided in the embodiments of this disclosure, the physical parameter during the data transmission process can be dynamically adjusted based on a delay status of the data transmission, thereby reducing a possibility of data transmission delays and improving reliability of the data transmission.

Further, since reliability of data transmission of a chip can be improved according to the solutions provided in the embodiments of this disclosure, performance of chip reliability is also greatly improved.

DETAILED DESCRIPTION OF THE EMBODIMENTS

Exemplary embodiments of this disclosure are described below in detail with reference to accompanying drawings. Obviously, the described embodiments are merely a part, rather than all of embodiments of this disclosure. It should be understood that the disclosure is not limited to the exemplary embodiments described herein.

It should be noted that the scope of this disclosure is not limited by relative arrangement of components and steps, numeric expressions, and numerical values described in these embodiments, unless the disclose specifies otherwise.

Application Overview

A chip is a circuit module that integrates multiple electronic components on a silicon board to implement a specific function. There are usually various types of chips, such as a system on chip (SoC), a microcontroller unit (MCU), a field programmable gate array (FPGA), and the like. In addition, each chip generally includes multiple modules, which may usually exchange data with each other. Moreover, some chips may also exchange data with other chips.

Taking the SoC as an example, multiple IP cores are usually disposed in the SoC. Data exchange may be performed between various IP cores in a same SoC.

Figure 1:
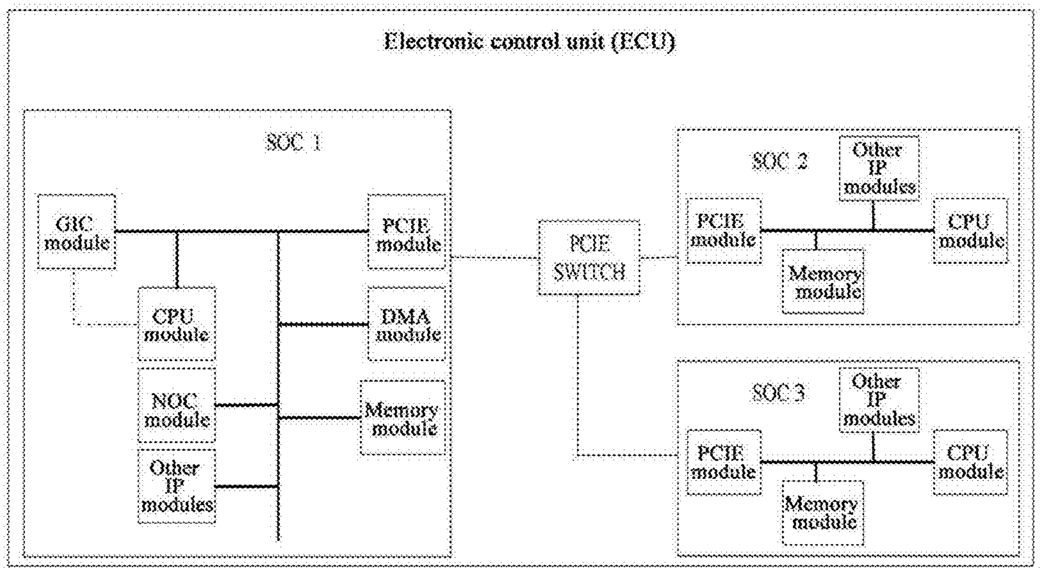
FIG. 1 is a schematic diagram of a conventional SoC.

In addition, the SoC may also be connected to other SoCs through buses (such as high-speed serial computer expansion buses) and exchange data with IP cores in other SoCs. Referring to the schematic architectural diagram of SoCs shown in FIG. 1, three SoCs SoC 1, SoC 2, and SoC 3 are shown in FIG. 1. The three SoCs are located in a same electronic control unit (ECU), and may be connected to each other through buses to form an integrated circuit module of the ECU. In an example, the ECU may be disposed in a vehicle-mounted intelligent terminal of a vehicle, so as to provide an assisted driving function or an autonomous driving function for the vehicle.

Referring to FIG. 1, there are multiple IP cores disposed in each SoC. The IP cores in the SoC 1 include a general interrupt controller (GIC) module, a central processing unit (CPU) module, a network on chip (NOC) control module, a high-speed serial computer expansion bus standard (peripheral component interconnect express PCIe) module, a direct memory access (DMA) module, a memory module, and other IP modules. The IP cores in the SoC 2 include a PCIe module, a CPU module, a memory module, and other IP modules. The IP cores in the SoC 3 include a PCIe module, a CPU module, a memory module, and other IP modules. In FIG. 1, solid lines connecting various IP modules in a same SoC represent on-chip buses, while dashed lines represent signal lines.

In this case, data may usually be transmitted between the various IP cores in the SoC to achieve data exchange, and may also be transmitted between different SoCs. For example, the IP core in the SoC 1 may transmit data to the IP cores in the SoC 2 and the SoC 3 for data exchange.

A transmitting end in the data exchange process may be referred to as a first processing unit, and a receiving end may be referred to as a second processing unit. Taking the SoC as an example, referring to FIG. 1, if data exchange is performed between the IP cores in the SoC 1, the IP cores that need to perform data exchange in the SoC 1 may be referred to the first processing unit and the second processing unit. If the IP core in the SoC 1 transmits data to the IP core in the SoC 2, the IP core in the SoC 1 may be referred to the first processing unit, and the IP core in the SoC 2 may be referred to the second processing unit.

However, there may be a transmission delay in the data exchange process between the first processing unit and the second processing unit, which causes the second processing unit that needs to obtain data to be unable to obtain the required data in a timely manner. Especially in some cases, when a large amount of data needs to be transmitted, there may be a severe transmission delay, which even causes the second processing unit to be unable to obtain the required data. The transmission delay in the chip may cause functional abnormalities to the modules in the chip (for example, the second processing unit that needs to receive data hangs), and may even cause overall functional failures to the chip.

For example, if the chip is configured to support the autonomous driving function of the vehicle, the transmission delay during data transmission may result in loss of the autonomous driving function of the vehicle.

Regarding the phenomenon of transmission delays, a timeout error monitoring technology is typically used in conventional schemes. In this technology, the process of data transmission is generally monitored by a module (such as the NOC control module in FIG. 1) in the chip, and an error is reported when it is monitored that timeout occurs to transmission of a piece of data.

However, through the timeout error monitoring technology, only the occurrence of transmission delays can be monitored. During error reporting, the transmission delay has already occurred and generally has led to functional abnormalities to the module in the chip or functional failures to the chip.

In view of the above, embodiments of this disclosure provide a data transmission method and an apparatus to reduce the occurrence of data transmission delays in the chip.

Exemplary System

Embodiments of this disclosure may be applied to chips that need to perform data exchange, which may include a SoC, a MCU, an FPGA, and the like. Moreover, the chip may be applied in various application scenarios, which may include assisted driving, autonomous driving, or the Internet of Things (IoT), and the like.

For example, in the application scenario of assisted driving or autonomous driving, various processing units in a same chip of a vehicle (such as an IP core in the SoC) or processing units between different chips may exchange data with each other according to the data transmission method provided in the embodiments of this disclosure, so as to reduce data transmission delays, thereby improving reliability of data transmission and further improving accuracy of assisted driving or autonomous driving.

To implement the data transmission method provided in the embodiments of this disclosure, a module capable of implementing the data transmission method is usually disposed in the chip. In a feasible example, this module may be a NOC control module in the schematic diagram shown in FIG. 1. In another feasible example, this module may be an additional module disposed on the basis of the conventional chip.

Figure 2:
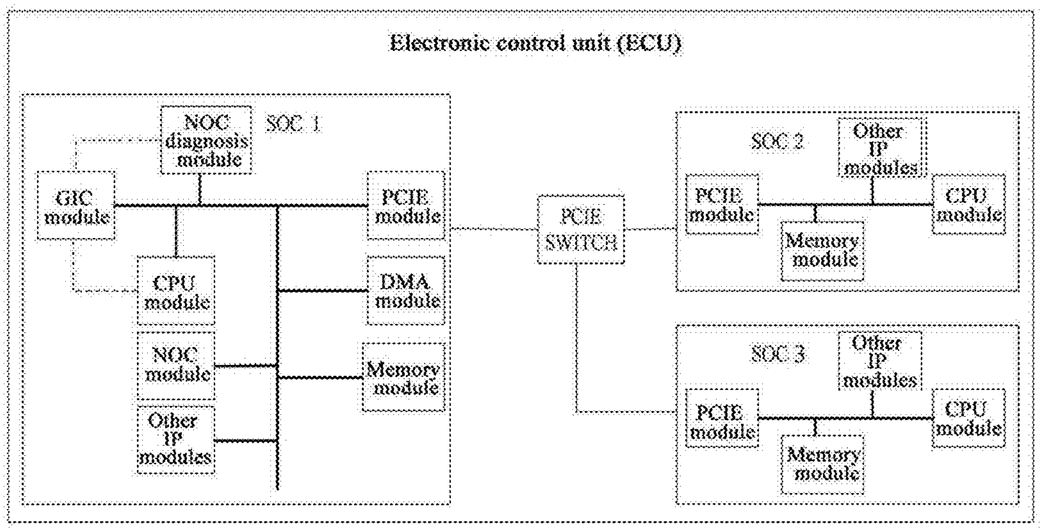
FIG. 2 is a schematic diagram of a SoC according to an exemplary embodiment of this disclosure.

FIG. 2 is an example diagram of a chip to which this disclosure is applicable. In this example, a chip to which the data transmission method provided in the embodiments of this disclosure is applied is a SoC. As shown in FIG. 2, there are three SoCs SoC 1, SoC 2, and SoC 3 disposed in an ECU. Data transmission may be performed between various IP cores in the SoC 1. In this case, both a first processing unit and a second processing unit are IP cores in the SoC 1. Moreover, the IP core in the SoC 1 may also perform data transmission with IP cores in other SoCs. In this case, the first processing unit may be the IP core in the SoC 1, and the second processing unit may be the IP core in another SoC. For this example, an NOC diagnosis module may be added in the SoC 1 to implement the data transmission method provided in the embodiments of this disclosure, so as to reduce a phenomenon of transmission delay during a data transmission process.

In addition, if data transmission is required for the SoC 2 or the SoC 3, an NOC diagnosis module may also be disposed in the SoC 2 or the SoC 3 to implement the data transmission method provided in the embodiments of this disclosure, so as to reduce a phenomenon of transmission delay during the data transmission process.

Exemplary Method

Figure 3:
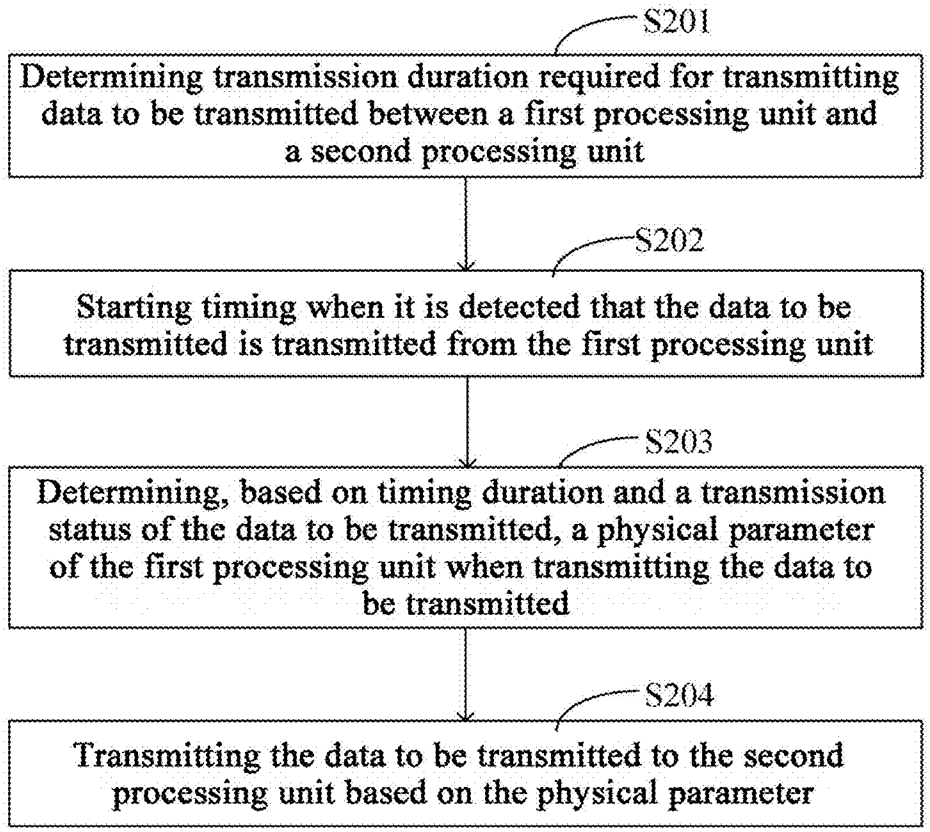
FIG. 3 is a schematic flowchart of a data transmission method according to an exemplary embodiment of this disclosure.

FIG. 3 is a schematic flowchart of a data transmission method according to an exemplary embodiment of this disclosure. This embodiment may be applied to an electronic device. As shown in FIG. 3, the method includes the following steps.

Step S201. Determining transmission duration required for transmitting data to be transmitted between a first processing unit and a second processing unit.

If the data to be transmitted is transmitted between modules in a same chip, the first processing unit and the second processing unit are located on the same chip. For example, if the data to be transmitted is transmitted between a CPU module and a memory module in a SoC 1 shown in FIG. 2, the first processing unit is the CPU module in the SoC 1 while the second processing unit is the memory module in the SoC 1.

If the data to be transmitted is transmitted between different chips, the first processing unit and the second processing unit are located on different chips. For example, if the data to be transmitted is transmitted between the SoC 1 and a SoC 2 shown in FIG. 2, for example, the data to be transmitted is transmitted by the CPU module in the SoC 1 and is received by a memory module in the SoC 2, the first processing unit is the CPU module in the SoC 1 while the second processing unit is the memory module in the SoC2.

Step S202. Starting timing when it is detected that the data to be transmitted is transmitted from the first processing unit.

If this data transmission is a data write operation, timing may be started when it is detected that the first processing unit starts transmitting a write address to the second processing unit. If this data transmission is a data read operation, timing may be started when it is detected that the first processing unit starts transmitting a read address to the second processing unit.

In an example, the first processing unit is the CPU module in the SoC 1 shown in FIG. 2, and the second processing unit is the memory module in the SoC 2 shown in FIG. 2. In this case, the CPU module in the SoC 1 may be monitored. Timing is started if this data transmission is a data write operation and it is determined through monitoring that the CPU module in the SoC 1 transmits a write address to the memory module in the SoC2. In addition, timing is started if this data transmission is a data read operation and it is determined through monitoring that the CPU module in the SoC 1 transmits a read address to the memory module in the SoC2.

Step S203. Determining, based on timing duration and a transmission status of the data to be transmitted, a physical parameter of the first processing unit when transmitting the data to be transmitted.

The transmission status of the data to be transmitted usually includes: a state in which the data to be transmitted is in transmission or a state in which the transmission of the data to be transmitted has ended. Generally, the physical parameter of the first processing unit when transmitting the data to be transmitted is determined if it is determined that there occurs a transmission delay to the data to be transmitted based on the timing duration and the transmission status of the data to be transmitted.

For example, the first processing unit is the CPU module in the SoC 1 shown in FIG. 2, and the second processing unit is the memory module in the SoC 2 shown in FIG. 2. It is indicated that there occurs a transmission delay to the data to be transmitted if the timing duration and the transmission status of the data to be transmitted indicate that the transmission status of the data to be transmitted is still that the data to be transmitted is in transmission after the transmission duration required for transmitting the data to be transmitted between the first processing unit and the second processing unit is reached. In this case, a physical parameter of the CPU module in the SoC 1 when transmitting the data to be transmitted is determined.

Step S204. Transmitting the data to be transmitted to the second processing unit based on the physical parameter.

Through step S203, the physical parameter of the first processing unit when transmitting the data to be transmitted may be determined when a transmission delay occurs to the data to be transmitted. In this case, to enable the second processing unit to obtain required data in a timely manner, the data to be transmitted may be transmitted to the second processing unit again based on the determined physical parameter.

For example, an architecture of the chip is shown in FIG. 2, where the first processing unit is the CPU module in the SoC1 and the second processing unit is the memory module in the SoC 2. When data transmission is performed according to the solution in this embodiment of this disclosure, the transmission duration required for transmitting the data to be transmitted between the CPU module in the SoC 1 and the memory module in the SoC 2 is first determined, and timing is started when it is detected that the data to be transmitted is transmitted from the CPU module in the SoC 1. If it is determined based on the timing duration and the transmission status of the data to be transmitted that there is a delay in the process in which the data to be transmitted is transmitted from the CPU module in the SoC 1 to the memory module in the SoC 2, a physical parameter of the CPU module in the SoC 1 when transmitting the data to be transmitted is determined, and then the data to be transmitted is transmitted to the memory module in the SoC 2 based on the physical parameter.

According to the solution provided in this embodiment of this disclosure, when there occurs a transmission delay to the data to be transmitted, the physical parameter of the first processing unit when transmitting the data to be transmitted can be adjusted, and the data to be transmitted can be transmitted to the second processing unit based on the adjusted physical parameter. That is, according to the solution provided in this embodiment of this disclosure, the physical parameter during the data transmission process can be dynamically adjusted based on whether there is a delay in data transmission, thereby reducing a possibility of data transmission delays and improving reliability of the data transmission.

Further, since reliability of data transmission of the chip can be improved according to the solution provided in this embodiment of this disclosure, performance of chip reliability is also greatly improved.

In addition, the first processing unit may need to transmit various types of data, such as an interrupt signal, a failure signal, a handshake signal, a control signal, application data, and a status signal.

If it is needed to instruct the second processing unit to enter an interrupt state, the first processing unit may transmit the interrupt signal. When a failure occurs to a module and the second processing unit is required for analysis, the first processing unit may transmit the failure signal, which may contain failure information of the module. If a handshake is required with the second processing unit, the first processing unit may transmit the handshake signal. When it is needed to control the second processing unit, the first processing unit may transmit the corresponding control signal to the second processing unit. When the second processing unit needs to obtain application data, the first processing unit may transmit the application data to the second processing unit. For example, if the first processing unit obtains a file from a portable hard disk and the file is required by the second processing unit, the first processing unit may transmit the application data including the file to the second processing unit. In addition, to enable the second processing unit to determine a status of the first processing unit, the first processing unit may transmit the status signal to the second processing unit. The status signal may include the status of the first processing unit.

In a possible implementation, the various types of data may be used as the data to be transmitted, and data transmission is performed according to the solution provided in this embodiment of this disclosure.

Alternatively, in another possible implementation, some of the various types of data may be used as the data to be transmitted, and data transmission is performed according to the solution provided in this embodiment of this disclosure, thereby reducing power consumption of the chip.

For example, due to a higher possibility of transmission delays for data with longer transmission duration, data with longer transmission duration among the various types of data that need to be transmitted by the first processing unit may be used as the data to be transmitted. For example, top five types of data with longest transmission duration are used as the data to be transmitted. Alternatively, since data with a higher priority is usually more important, to reduce transmission delays of the important data, the data with a higher priority among the various types of data that need to be transmitted by the first processing unit may be used as the data to be transmitted.

In this embodiment of this disclosure, the physical parameter of the first processing unit when transmitting the data to be transmitted may be determined based on the timing duration and the transmission status of the data to be transmitted. In a feasible implementation, the physical parameter includes a parameter for controlling a transmission speed of the data to be transmitted.

For example, in general, the wider the bandwidth for data transmission, the faster the data transmission speed. In other words, the transmission bandwidth of the data has certain impact on the transmission speed of the data. Therefore, when it is determined based on the timing duration and the transmission status of the data to be transmitted that a transmission delay occurs to the data to be transmitted, a transmission bandwidth of the data to be transmitted may be increased, and the corresponding physical parameter may include a transmission bandwidth of the data to be transmitted. Alternatively, if different levels of priorities are preset for the data, when a priority of a piece of data is higher, a wider transmission bandwidth is allocated to the piece of data and a corresponding transmission speed of the piece of data is faster. In other words, the priority of the data has certain impact on the transmission speed of the data. Therefore, when it is determined based on the timing duration and the transmission status of the data to be transmitted that a transmission delay occurs to the data to be transmitted, a priority of the data to be transmitted may be increased. In this case, the physical parameter may include the priority of the data to be transmitted.

In the solution provided in this embodiment of this disclosure, the physical parameter includes a parameter for controlling the transmission speed of the data to be transmitted. In this case, if it is determined based on the timing duration and the transmission status of the data to be transmitted that a transmission delay occurs to the data to be transmitted, the physical parameter may be adjusted and the data to be transmitted may be transmitted based on the adjusted physical parameter, so as to accelerate the transmission speed of the data to be transmitted, thereby reducing occurrence of transmission delays and improving the reliability of the data transmission.

In step S201, the operation of determining the transmission duration required for transmitting the data to be transmitted between the first processing unit and the second processing unit is disclosed. In this embodiment of this disclosure, data transmission typically includes a data write operation and a data read operation. Referring to the schematic diagram of data exchange shown in FIG. 4, if the data transmission is a data write operation, the data transmission process generally includes the following steps.

Step 1. The first processing unit transmits a write address (AW) to the second processing unit.

Step 2. The first processing unit reads data from the second processing unit.

Step 3. The second processing unit transmits a write response to the first processing unit, which receives the write response.

In this scenario, the transmission duration required for transmitting the data to be transmitted between the first processing unit and the second processing unit is usually duration from the first processing unit starting transmitting the write address to the first processing unit receiving the write response. In this embodiment of this disclosure, the required transmission duration may be determined in advance by monitoring this process.

If the data transmission is a data read operation, the data transmission process generally includes the following steps.

Step 1. The first processing unit transmits a read address (AR) to the second processing unit.

Step 2. The second processing unit transmits data corresponding to the read address to the first processing unit, which obtains the data.

In this scenario, the transmission duration required for transmitting the data to be transmitted between the first processing unit and the second processing unit is usually duration from the first processing unit starting transmitting the read address to successfully obtaining the data that needs to be read. In this embodiment of this disclosure, the required transmission duration may be determined in advance by monitoring this process.

Figure 4:
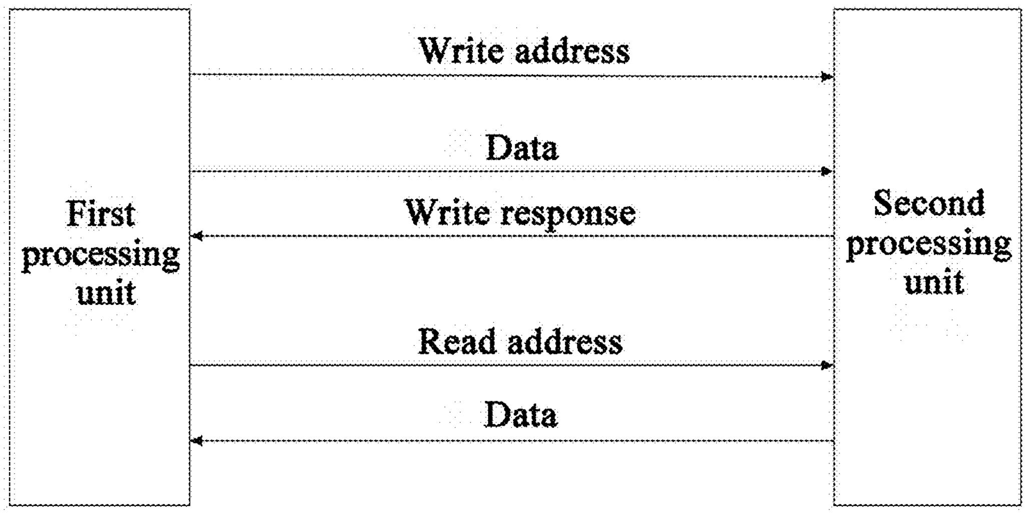
FIG. 4 is a schematic diagram of data exchange according to an exemplary embodiment of this disclosure.
Figure 5:
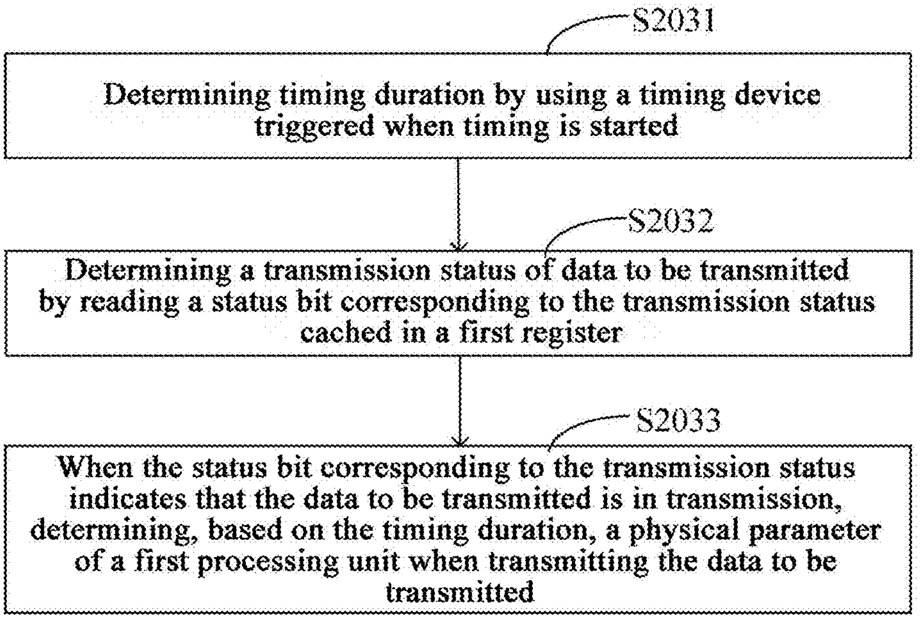
FIG. 5 is a schematic flowchart of a data transmission method according to another exemplary embodiment of this disclosure.

Referring to FIG. 5, in another exemplary embodiment of this disclosure, based on the foregoing embodiment shown in FIG. 4, the physical parameter of the first processing unit when transmitting the data to be transmitted may be determined according to the following steps.

Step S2031. Determining timing duration by using a timing device triggered when timing is started.

In this embodiment, the timing device may be disposed within a chip where the first processing unit is located. For example, if the first processing unit is the IP core in the SoC 1 shown in FIG. 2, the timing device may be disposed in the NOC diagnosis module shown in FIG. 2.

When it is detected that the data to be transmitted is transmitted from the first processing unit, the timing device may be triggered to start timing, and the timing duration may be determined by reading timing information of the timing device. If the timing device is disposed in the NOC diagnosis module, the NOC diagnosis module triggers the timing device when detecting that the first processing unit transmits the data to be transmitted, and determines the timing duration by reading the timing information passed by the timing device.

Step S2032. Determining the transmission status of the data to be transmitted by reading a status bit corresponding to the transmission status cached in a first register.

In this embodiment, the first register may be disposed within the chip where the first processing unit is located. For example, if the first processing unit is the IP core in the SoC 1 shown in FIG. 2, the first register may be disposed in the NOC diagnosis module shown in FIG. 2.

The first register is configured to cache the status bit corresponding to the transmission status. If the data to be transmitted is in transmission, the first register usually caches a corresponding first status bit, which is used to indicate that the data to be transmitted is in transmission. In addition, if the transmission of the data to be transmitted ends, the status bit cached in the first register is adjusted to a corresponding second status bit, which indicates that the transmission of the data to be transmitted has ended.

In this case, the transmission status of the data to be transmitted may be determined by reading the status bit corresponding to the transmission status cached in the first register. If the first register is disposed in the NOC diagnosis module shown in FIG. 2, the NOC diagnosis module may read the status bit cached in the first register and determine the transmission status of the data to be transmitted based on the status bit.

Step S2033. Determining, based on the timing duration, the physical parameter of the first processing unit when transmitting the data to be transmitted, when the status bit corresponding to the transmission status indicates that the data to be transmitted is in transmission.

If the status bit corresponding to the transmission status indicates that the data to be transmitted is in transmission, it indicates that the transmission has not been completed and there may be a transmission delay. Therefore, whether the physical parameter of the first processing unit when transmitting the data to be transmitted needs to be determined may be determined based on the timing duration and the transmission duration required for transmitting the data to be transmitted between the first processing unit and the second processing unit.

According to the solution disclosed in this embodiment, the timing duration can be determined based on the timing device and the transmission status of the data to be transmitted can be determined based on cache of the first register, so as to determine, based on the timing duration and the transmission status of the data to be transmitted, the physical parameter of the first processing unit when transmitting the data to be transmitted.

There are usually multiple types of timing devices. In a feasible example, the timing device for timing may include a time-meter. When the timing device includes the time-meter, step S2031 may be implemented through the following operation: determining the timing duration by periodically reading timing information of the time-meter.

That is, in this embodiment, when it is detected that the data to be transmitted is transmitted from the first processing unit, the time-meter is triggered to start timing, so that the timing duration may be determined by using the time-meter.

Figure 6:
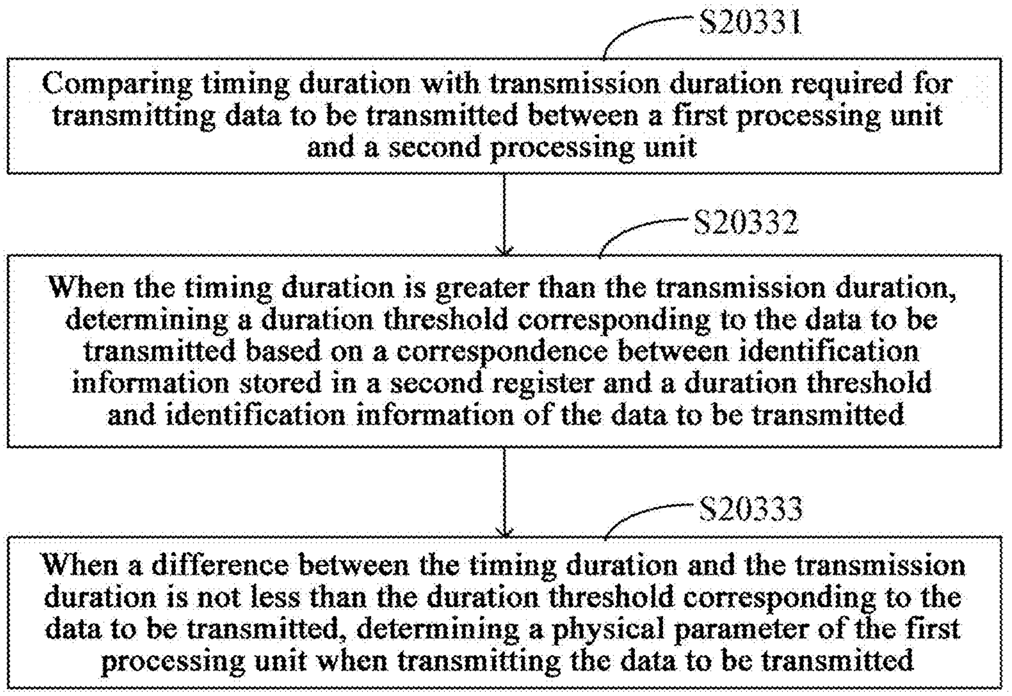
FIG. 6 is a schematic flowchart of a data transmission method according to still another exemplary embodiment of this disclosure.

Correspondingly, referring to FIG. 6, in another exemplary embodiment of this disclosure, based on the foregoing embodiment shown in FIG. 4, determining, based on the timing duration, the physical parameter of the first processing unit when transmitting the data to be transmitted may include the following steps.

Step S20331. Comparing the timing duration with the transmission duration required for transmitting the data to be transmitted between the first processing unit and the second processing unit.

Step S20332. When the timing duration is greater than the transmission duration, determining a duration threshold corresponding to the data to be transmitted based on a correspondence between identification information stored in a second register and a duration threshold and identification information of the data to be transmitted.

The identification information includes at least one of the following: an address, a data identifier (DID), and a transmission channel. This address usually includes a source address and a destination address.

In this embodiment, the second register may be disposed within the chip where the first processing unit is located. For example, if the first processing unit is the IP core in the SoC 1 shown in FIG. 2, the second register may be disposed in the NOC diagnosis module shown in FIG. 2. In addition, the first register may be same as or different from the second register, which is not limited in this embodiment of this disclosure.

The correspondence between the identification information and the duration threshold may be determined in different ways. In an example, for data with a higher priority or more important data, identification information thereof corresponds to a smaller duration threshold. Alternatively, in another example, it may be set that for data with longer transmission duration, identification information thereof corresponds to a greater duration threshold. Certainly, the correspondence may also be set in other ways, which is not limited in this embodiment of this disclosure.

If the second register is disposed in the NOC diagnosis module shown in FIG. 2, when the NOC diagnosis module determines that the timing duration is greater than the transmission duration, the correspondence between the identification information stored in the second register and the duration threshold and the identification information of the data to be transmitted may be read, and the duration threshold corresponding to the data to be transmitted may be determined accordingly.

Step S20333. When a difference between the timing duration and the transmission duration is not less than the duration threshold corresponding to the data to be transmitted, determining the physical parameter of the first processing unit when transmitting the data to be transmitted.

If the difference between the timing duration and the transmission duration is not less than the duration threshold corresponding to the data to be transmitted, it indicates that there is a delay in the transmission of the data to be transmitted. In this case, it is needed to determine the physical parameter of the first processing unit when transmitting the data to be transmitted.

In this embodiment of this disclosure, the timing duration is determined by periodically reading the timing information of the time-meter, and the duration threshold corresponding to the data to be transmitted is determined based on the correspondence between the identification information stored in the second register and the duration threshold. In this way, whether the physical parameter of the first processing unit when transmitting the data to be transmitted needs to be determined can be determined based on the duration threshold.

Further, in this solution, the second register may store correspondences between various identification information and the duration threshold, so that the physical parameter of the first processing unit when transmitting various data to be transmitted can be determined based on these correspondences, thereby meeting transmission requirements of various data.

In a feasible example, the timing device for timing may include an intervalometer. When the timing device includes the intervalometer, step S2031 may be implemented through the following operation:

determining the timing duration by reading timing information generated by the intervalometer. The intervalometer is configured to generate the timing information when a difference between current time and trigger time reaches warning duration. The warning duration is greater than the transmission duration required for transmitting the data to be transmitted between the first processing unit and the second processing unit.

In this embodiment, the intervalometer is triggered when it is detected that transmission of the data to be transmitted starts from the first processing unit. The intervalometer generates the timing information when the difference between the current time and the trigger time reaches the warning duration. In this case, duration between the current time and the trigger time may be used as the transmission duration of the data to be transmitted. In other words, the intervalometer generates the timing information when the transmission duration of the data to be transmitted reaches the warning duration.

Through the timing information, it may be determined that there is a delay in the transmission process of the data to be transmitted, so that the physical parameter of the first processing unit when transmitting the data to be transmitted needs to be determined.

Further, in this solution, only the intervalometer needs to be disposed and the physical parameter may be determined by reading the timing information generated by the intervalometer, making the operation manner relatively simple. Moreover, in this solution, the timing information may be obtained when the transmission duration of the data to be transmitted reaches the warning duration. Therefore, whether there is a transmission delay in the data to be transmitted can be determined in a timely manner, thereby improving efficiency of data transmission.

Figure 7:
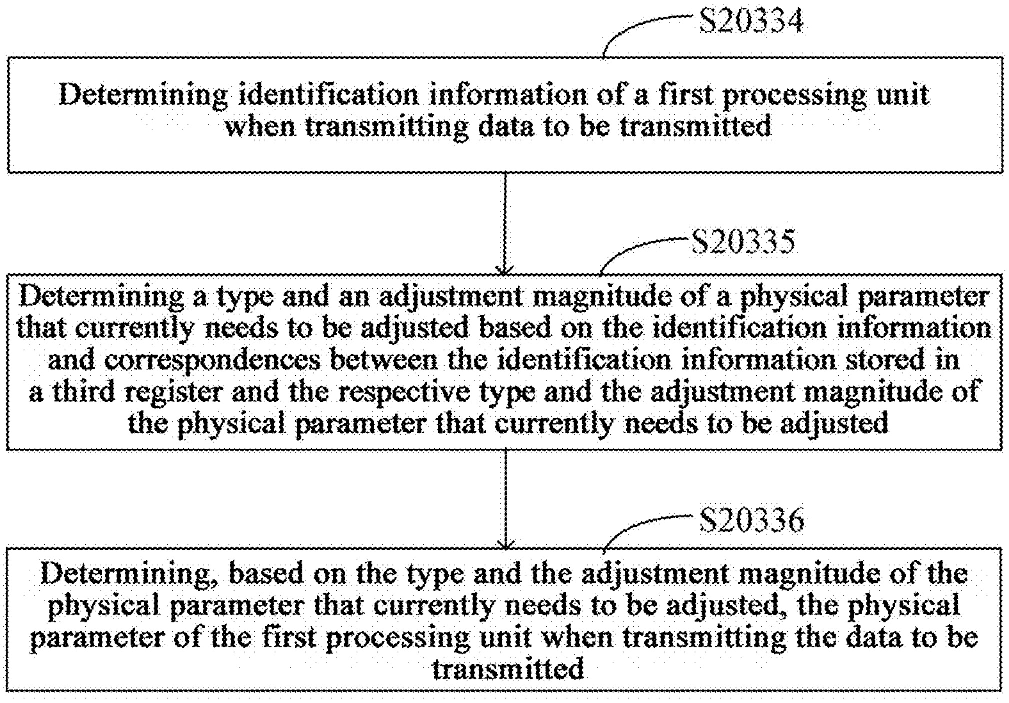
FIG. 7 is a schematic flowchart of a data transmission method according to yet another exemplary embodiment of this disclosure.

Referring to FIG. 7, in another exemplary embodiment of this disclosure, based on the foregoing embodiment shown in FIG. 4, the physical parameter of the first processing unit when transmitting the data to be transmitted may be determined according to the following steps.

Step S20334. Determining identification information of the first processing unit when transmitting the data to be transmitted.

The identification information includes at least one of the following: an address, a data identifier DID, and a transmission channel.

Step S20335. Determining a type and an adjustment magnitude of the physical parameter that currently needs to be adjusted based on the identification information and correspondences between the identification information stored in a third register and the respective type and the adjustment magnitude of the physical parameter that currently needs to be adjusted.

In this embodiment, the third register may be disposed within the chip where the first processing unit is located. For example, if the first processing unit is the IP core in the SoC 1 shown in FIG. 2, the third register may be disposed in the NOC diagnosis module shown in FIG. 2. In addition, the third register may be same as or different from the first register or the second register, which is not limited in this embodiment of this disclosure.

The third register is configured to store the correspondences between the preset identification information and the type and the adjustment magnitude of the physical parameter that currently needs to be adjusted.

In a feasible example, the adjustment magnitude in the correspondence may be a specific numerical value, which may be, for example, represented according to Table 1.

TABLE 1

| Identification information | Type of physical parameter | Adjustment magnitude |
|---|---|---|
| DID 1 | Priority | Level 1 |
| DID 2 | Transmission bandwidth | 10% |
| Transmission channel 1 | Priority and transmission bandwidth | Level 1, 5% |
| Transmission channel 2 | Operating frequency | 5% |

In the example corresponding to Table 1, when the identification information is the DID 1, the corresponding physical parameter that needs to be adjusted is the priority, and the corresponding adjustment magnitude is the level 1. When the identification information is the DID 2, the corresponding physical parameter that needs to be adjusted is the transmission bandwidth, and the corresponding adjustment magnitude is 10%. When the identification information is the transmission channel 1, corresponding physical parameters that need to be adjusted are the priority and the transmission bandwidth, and the corresponding adjustment magnitudes are the level 1 and 5%, respectively. When the identification information is the transmission channel 2, the corresponding physical parameter that needs to be adjusted is the operating frequency, and the corresponding adjustment magnitude is 5%.

In the correspondence, if the identification information of the data to be transmitted corresponds to at least two physical parameters that need to be adjusted, the at least two physical parameters may all be used as the physical parameters that currently need to be adjusted, or any one thereof may be selected as the physical parameter that currently needs to be adjusted.

For example, in Table 1, when the identification information is the transmission channel 1, the physical parameters that need to be adjusted which are indicated by the correspondence are the priority and the transmission bandwidth. In this case, it may be determined that the physical parameters that currently need to be adjusted include the priority and the transmission bandwidth, and both of the two physical parameters may be adjusted in subsequent operations. Alternatively, only the priority or the transmission bandwidth may be used as the physical parameter that currently needs to be adjusted.

In another feasible example, the adjustment magnitudes in the correspondence may include adjustment magnitudes respectively corresponding to different ranges of the physical parameter. In this case, the corresponding adjustment magnitude may be determined based on the range of the physical parameter.

For example, if the physical parameter includes the priority and the priority includes seven levels, it may be set in the correspondence that when a priority of a piece of data is from level 1 to level 3, the corresponding adjustment magnitude is the level 2; when the priority of a piece of data is from level 4 to level 6, the corresponding adjustment magnitude is the level 1; and when the priority of a piece of data is level 7, the corresponding adjustment magnitude is a level 0. In this case, if a current priority of the data to be transmitted is the level 3, it is determined that an adjustment magnitude of a priority that needs to be adjusted is the level 2. In other words, after adjustment, the priority of the data to be transmitted is a level 5.

In addition, if the physical parameter includes the transmission bandwidth, it may be set in the correspondence that when an idle transmission bandwidth is within a range of a-b MHz, the corresponding adjustment magnitude is c MHz; and when the idle transmission bandwidth is within a range of d-e MHz, the corresponding adjustment magnitude is f MHz, wherein a, b, c, d, e, and f are all positive numbers, and it is satisfied that $c \leq a < b$, and $f \leq d < e$. In this case, if the current idle transmission bandwidth is g MHz and it is satisfied that $a < g < b$, it is determined that the adjustment magnitude of the transmission bandwidth that needs to be adjusted is c Mhz. In other words, after adjustment, the transmission bandwidth of the data to be transmitted is increased by c MHz.

Step S20336. Determining, based on the type and the adjustment magnitude of the physical parameter that currently needs to be adjusted, the physical parameter of the first processing unit when transmitting the data to be transmitted.

In this step, the physical parameter may be adjusted based on a current value and the adjustment magnitude of the physical parameter.

According to the solution provided in this embodiment of this disclosure, the physical parameter of the first processing unit when transmitting the data to be transmitted may be determined based on the identification information corresponding to the data to be transmitted and the correspondences between the identification information and the respective type and the adjustment magnitude of the physical parameter that currently needs to be adjusted, so as to adjust the physical parameter, thereby reducing occurrence of transmission delays by transmitting the data to be transmitted based on the adjusted physical parameter.

The physical parameter may include multiple types. In another exemplary embodiment of this disclosure, based on the foregoing embodiment shown in FIG. 4, the physical parameter of the first processing unit when transmitting the data to be transmitted may be determined according to the following steps:

- when the type of the physical parameter that currently needs to be adjusted includes a priority, determining an adjusted priority based on a current priority of the data to be transmitted and the adjustment magnitude; and
- assigning a corresponding priority identifier to the data to be transmitted based on the adjusted priority, or caching the data to be transmitted into a transmission queue corresponding to the adjusted priority.

If the type of the physical parameter that currently needs to be adjusted includes the priority, the priority of the data to be transmitted is adjusted based on the current priority of the data to be transmitted and the adjustment magnitude.

If the type of the physical parameter that currently needs to be adjusted includes the priority, the priority of the data to be transmitted is usually increased based on the adjustment magnitude, so as to improve the transmission speed of the data to be transmitted. For example, if the priority of the data is divided into seven levels in advance, where a higher level indicates a higher priority, the current priority of the data to be transmitted is a third level, and the adjustment magnitude is a level 1, it may be determined that the adjusted priority is a fourth level.

During the data transmission process of the first processing unit, the priority of the data may be determined by reading the priority identifier of the data. In this case, after the adjusted priority is determined, the corresponding priority identifier may be assigned to the data to be transmitted.

In addition, during the data transmission process of the first processing unit, the data may also be cached into the corresponding transmission queue based on the priority of the data. In this case, after the adjusted priority is determined, the data to be transmitted may be cached into the transmission queue corresponding to the adjusted priority.

When the type of the physical parameter that currently needs to be adjusted includes the transmission bandwidth, determining the physical parameter of the first processing unit when transmitting the data to be transmitted may include the following step:

- determining an adjusted physical bandwidth based on a current physical bandwidth of the data to be transmitted and the adjustment magnitude.

If the type of the physical parameter that currently needs to be adjusted includes the transmission bandwidth, the transmission bandwidth of the data to be transmitted is usually increased based on the adjustment magnitude. For example, if the adjustment magnitude is 10%, the transmission bandwidth may be increased by 10% based on the current transmission bandwidth.

When the type of the physical parameter that currently needs to be adjusted includes a operating frequency, determining the physical parameter of the first processing unit when transmitting the data to be transmitted may include the following step:

- determining an adjusted operating frequency based on a current operating frequency and the adjustment magnitude.

In this step, the operating frequency of the first processing unit or the chip on which the first processing unit is located may usually be reduced based on the adjustment magnitude. For example, if the adjustment magnitude is 5%, the operating frequency of the first processing unit or the chip on which the first processing unit is located may be reduced by 5% based on the current operating frequency.

In addition, the operating frequency of the first processing unit or the chip on which the first processing unit is located is reduced, so that sensitivity of the second processing unit to transmission delays may be reduced. In this case, demand of the second processing unit for the data to be transmitted is reduced, thereby correspondingly reducing the transmission delays.

For example, if a piece of data to be transmitted takes more than 30 ms during the transmission process, it is considered that there is a transmission delay. However, after the operating frequency is reduced, demand of the second processing unit for this piece of data to be transmitted is reduced. It is considered that there is a transmission delay merely when this piece of data to be transmitted takes more than 32 ms during the transmission process, so that transmission delays can be reduced.

According to the solution provided in this embodiment of this disclosure, the physical parameter of the first processing unit when transmitting the data to be transmitted may be adjusted. Transmitting the data to be transmitted based on the adjusted physical parameter helps to reduce data transmission delays and improve the reliability of data transmission.

In another exemplary embodiment of this disclosure, based on the foregoing embodiment shown in FIG. 4, determining the physical parameter of the first processing unit when transmitting the data to be transmitted may include the following steps.

Step 1. Determining a number of adjustment for the physical parameter by reading count information of a counter, where the counter is configured to count a number of adjustment made to the physical parameter.

In this embodiment of this disclosure, the counter may be disposed within the chip where the first processing unit is located. For example, if the first processing unit is the IP core in the SoC 1 shown in FIG. 2, the counter may be disposed in the NOC diagnosis module shown in FIG. 2. The counter is configured to count the number of adjustment made to the physical parameter. In other words, every time the physical parameter is adjusted, the counter is incremented by one based on a current count.

In this case, the number of adjustment of the physical parameter may be determined by reading the count information of the counter.

Step 2. When the number of adjustment is less than a number threshold corresponding to the data to be transmitted, determining the physical parameter of the first processing unit when transmitting the data to be transmitted.

That is, the physical parameter of the first processing unit when transmitting the data to be transmitted is determined merely when the number of adjustment of the physical parameter is less than the number threshold.

In some application scenarios, such as a chip failure, although the physical parameter is adjusted multiple times, transmission delays may still occur. In this case, if the physical parameter is adjusted every time a transmission delay occurs, not only the problem of transmission delay is not resolved, but wasted power consumption is also resulted in.

Regarding this issue, in the solution provided in this embodiment, the corresponding number threshold is set for the physical parameter, and the physical parameter of the first processing unit when transmitting the data to be transmitted is determined merely when the number of adjustment of the physical parameter is less than the number threshold. Thus, wastes of power consumption can be reduced while transmission delays are reduced.

In addition, if it is determined based on the count information of the counter that the number of adjustment of the physical parameter is not less than the number threshold, prompt information may also be generated to prompt technicians to detect performance of the chip.

Further, in another exemplary embodiment of this disclosure, when the number of adjustment is greater than or equal to the number threshold corresponding to the data to be transmitted, data transmission and timing may be continued while the physical parameter is kept unchanged. In this case, if it is determined based on the timing duration and the transmission status of the data to be transmitted that the timing duration reaches interrupt duration but the data to be transmitted is still in transmission, timeout error handling may be performed.

The interruption duration is usually greater than the warning duration. If the timing duration reaches the interrupt duration but the data to be transmitted is still in transmission, it indicates that after the warning duration, the transmission of the data to be transmitted is still not completed, and the data to be transmitted encounters a severe transmission delay. In this case, it may be considered that there is a timeout error in the transmission of the data to be transmitted, and thus timeout error handling may be performed.

The timeout error handling may include invoking a preset timeout error handling function to fix the timeout error. Moreover, the timeout error handling may also include generating warning information to prompt the technicians to pay attention to the severe transmission delay in a timely manner, so that the technicians can take corresponding measures in a timely manner to avoid affecting normal operation of the chip.

Figure 8:
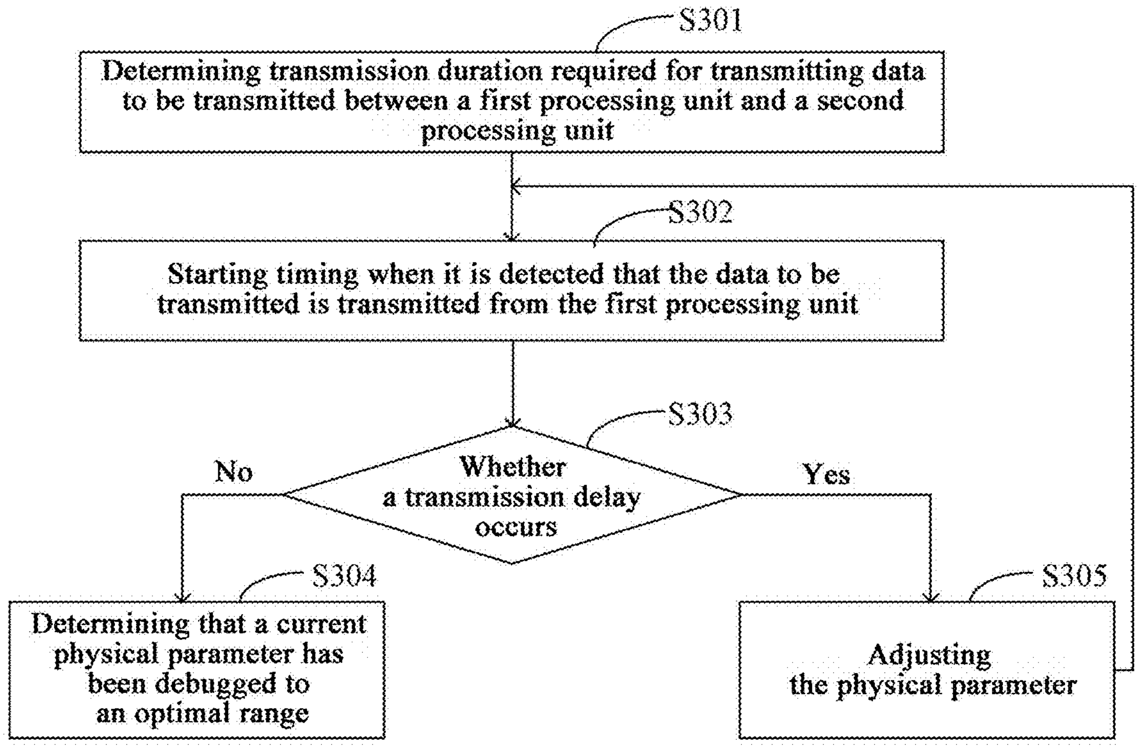
FIG. 8 is a schematic flowchart of a data transmission method according to still yet another exemplary embodiment of this disclosure.

To clarify advantages of this disclosure, an application scenario of the data transmission method according to the embodiments of this disclosure is provided below. In this application scenario, it is needed to identify whether there is a transmission delay, so as to pertinently debug the physical parameter, thereby improving the reliability of data transmission and making the chip have better performance. In this case, referring to FIG. 8, the data transmission method may include the following steps.

Step S301. Determining transmission duration required for transmitting data to be transmitted between a first processing unit and a second processing unit.

Step S302. Starting timing when it is detected that the data to be transmitted is transmitted from the first processing unit.

Operations of steps S301 and S302 are same as those of steps S201 and S202, and reference may be made to each other. Details are not described herein again.

Step S303. Determining, based on timing duration and a transmission status of the data to be transmitted, whether a transmission delay occurs to the first processing unit when transmitting the data to be transmitted.

If not, the operation of step S304 is performed; and if yes, the operation of step S305 is performed.

Step S304. If it is determined that no transmission delay occurs to the first processing unit when transmitting the data to be transmitted, determining that a current physical parameter has been adjusted to an optimal range and the adjustment of the physical parameter is complete.

Step S305. If it is determined that a transmission delay occurs to the first processing unit when transmitting the data to be transmitted, adjust the physical parameter and return to perform the operation of step S302.

For the method of adjusting the physical parameter, reference may be made to steps S20334 to S20336, and details are not described herein again.

According to the solution in this embodiment, the physical parameter may be adjusted, and transmission delays can be reduced by transmitting data through a adjusted chip, thereby improving reliability of data transmission and improving the performance of the chip.

Exemplary Apparatus

Figure 9:
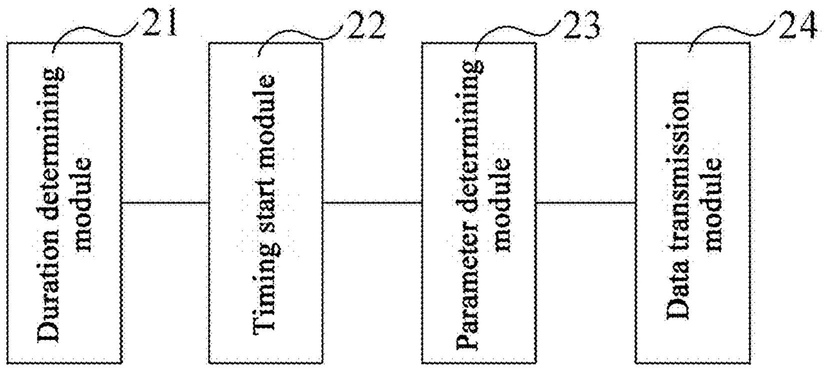
FIG. 9 is a diagram of a structure of a data transmission apparatus according to an exemplary embodiment of this disclosure.

FIG. 9 is a diagram of a structure of a data transmission apparatus according to an exemplary embodiment of this disclosure. The data transmission apparatus may be disposed in an electronic device such as a terminal device or a server, or on an object such as a vehicle, to implement the data transmission method according to any one of the foregoing embodiments of this disclosure. As shown in FIG. 9, the data transmission apparatus in this embodiment includes a duration determining module 21, a timing start module 22, a parameter determining module 23, and a data transmission module 24.

The duration determining module 21 is configured to determine transmission duration required for transmitting data to be transmitted between a first processing unit and a second processing unit.

The timing start module 22 is configured to start timing when it is detected that the data to be transmitted is transmitted from the first processing unit.

The parameter determining module 23 is configured to determine, based on timing duration determined by the timing start module 22 and a transmission status of the data to be transmitted, a physical parameter of the first processing unit when transmitting the data to be transmitted.

The data transmission module 24 is configured to transmit the data to be transmitted to the second processing unit based on the physical parameter determined by the parameter determining module 23.

According to the solution provided in this embodiment of this disclosure, the physical parameter during the data transmission process can be dynamically adjusted based on whether there is a delay in data transmission, thereby reducing a possibility of data transmission delays and improving reliability of the data transmission.

Further, since reliability of data transmission of the chip can be improved according to the solution provided in this embodiment of this disclosure, performance of the chip is also optimized.

In a feasible example, the physical parameter includes a parameter for controlling a transmission speed of the data to be transmitted.

Figure 10:
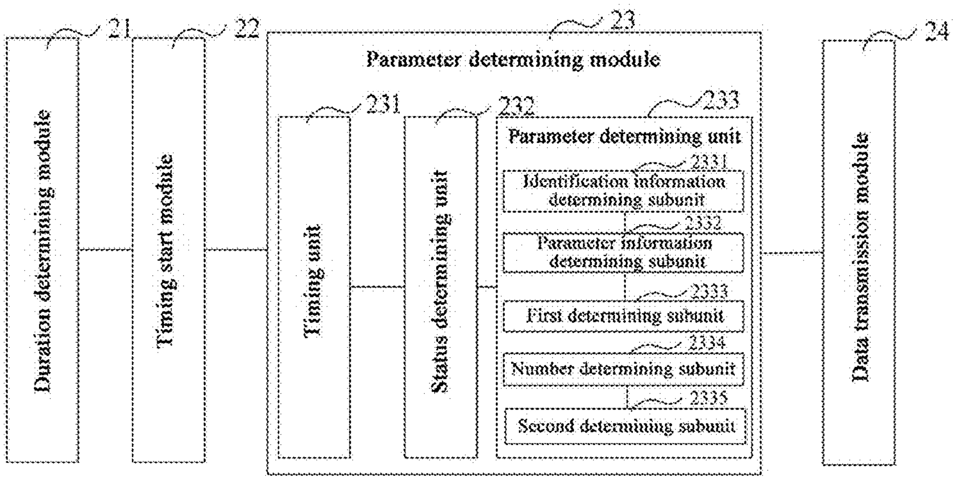
FIG. 10 is a diagram of a structure of a data transmission apparatus according to another exemplary embodiment of this disclosure.

Further, referring to the schematic structural diagram shown in FIG. 10, in a feasible example, the parameter determining module 23 includes:

- a timing unit 231, configured to determine timing duration by using a timing device triggered when timing is started;
- a status determining unit 232, configured to determine the transmission status of the data to be transmitted by reading a status bit corresponding to the transmission status cached in a first register;
- a parameter determining unit 233, configured to determine, based on the timing duration, the physical parameter of the first processing unit when transmitting the data to be transmitted when the status bit corresponding to the transmission status indicates that the data to be transmitted is in transmission.

When the timing device includes a time-meter, the timing unit 231 is configured to determine the timing duration by periodically reading timing information of the time-meter.

Moreover, in this case, the parameter determining unit 233 includes a comparison subunit, a threshold determining subunit, and a parameter determining subunit.

The comparison subunit is configured to compare the timing duration with the transmission duration.

When the comparison subunit determines that the timing duration is greater than the transmission duration, the threshold determining subunit is configured to determine a duration threshold corresponding to the data to be transmitted based on a correspondence between identification information stored in a second register and a duration threshold and identification information of the data to be transmitted. The identification information includes at least one of the following: an address, a data identifier DID, and a transmission channel.

When a difference between the timing duration and the transmission duration is not less than the duration threshold corresponding to the data to be transmitted that is determined by the threshold determining subunit, the parameter determining subunit is configured to determine the physical parameter of the first processing unit when transmitting the data to be transmitted.

When the timing device includes an intervalometer, the timing unit 231 is configured to determine the timing duration by reading timing information generated by the intervalometer. The intervalometer is configured to generate the timing information when a difference between current time and trigger time reaches warning duration, wherein the warning duration is greater than the transmission duration.

In a feasible example, the parameter determining unit 233 includes an identification information determining subunit 2331, a parameter information determining subunit 2332, and a first determining subunit 2333.

The identification information determining subunit 2331 is configured to determine identification information of the first processing unit when transmitting the data to be transmitted. The identification information includes at least one of the following: an address, a data identifier DID, and a transmission channel.

The parameter information determining subunit 2332 is configured to determine a type and an adjustment magnitude of the physical parameter that currently needs to be adjusted based on the identification information determined by the identification information determining subunit 2331 and correspondences between the identification information stored in a third register and the respective type and the adjustment magnitude of the physical parameter that currently needs to be adjusted.

The first determining subunit 2333 is configured to determine, based on the type and the adjustment magnitude of the physical parameter that currently needs to be adjusted determined by parameter information determining subunit 2332, the physical parameter of the first processing unit when transmitting the data to be transmitted.

In a feasible example, when the type of the physical parameter that currently needs to be adjusted includes a priority, the first determining subunit 2333 is configured to determine an adjusted priority based on a current priority of the data to be transmitted and the adjustment magnitude; and assign a corresponding priority identifier to the data to be transmitted based on the adjusted priority, or cache the data to be transmitted into a transmission queue corresponding to the adjusted priority.

Alternatively, when the type of the physical parameter that currently needs to be adjusted includes a transmission bandwidth, the first determining subunit 2333 is configured to determine an adjusted physical bandwidth based on a current physical bandwidth of the data to be transmitted and the adjustment magnitude.

In addition, when the type of the physical parameter that currently needs to be adjusted includes a operating frequency, the first determining subunit 2333 is configured to determine an adjusted operating frequency based on a current operating frequency and the adjustment magnitude.

In a feasible example, the parameter determining unit 233 includes a number determining subunit 2334 and a second determining subunit 2335.

The number determining subunit 2334 is configured to determine an number of adjustment for the physical parameter by reading count information of a counter. The counter is configured to count a number of adjustment made to the physical parameter.

When the number determining subunit 2334 determines that the number of adjustment is less than a number threshold corresponding to the data to be transmitted, the second determining subunit 2335 is configured to determine the physical parameter of the first processing unit when transmitting the data to be transmitted.

Exemplary Electronic Device

An electronic device according to an embodiment of this disclosure is described below with reference to FIG. 11. In an exemplary embodiment of this disclosure, the electronic device may be a NOC diagnosis module shown in FIG. 2, or a chip including the NOC diagnosis module. Certainly, the electronic device may also be in other forms, which is not limited in this disclosure.

Figure 11:
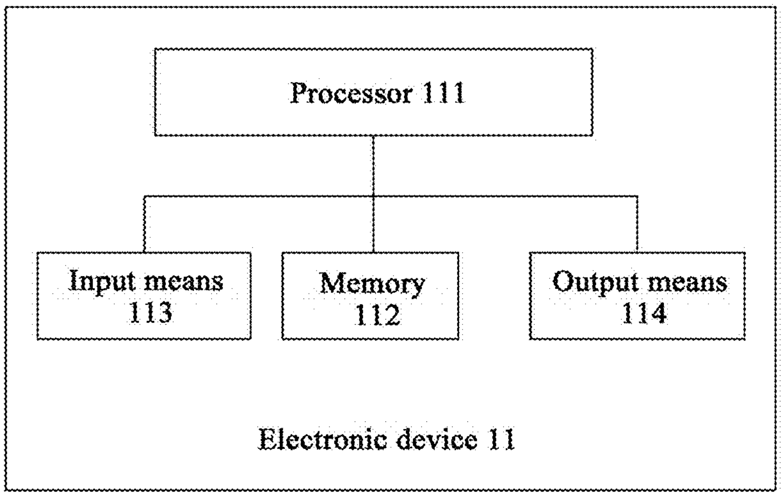
FIG. 11 is a diagram of a structure of an electronic device according to an exemplary embodiment of this disclosure.

FIG. 11 shows a block diagram of an electronic device according to an embodiment of this disclosure.

As shown in FIG. 11, an electronic device 11 includes one or more processors 111 and a memory 112.

The processor 111 may be a central processing unit (CPU) or another form of processing unit having a data processing capability and/or an instruction execution capability, and can control another component in the electronic device 11 to perform a desired function.

The memory 112 may include one or more computer program products, which may include various forms of computer readable storage media, such as a volatile memory and/or a non-volatile memory. The volatile memory may include, for example, a random access memory (RAM) and/or a cache. The nonvolatile memory may include, for example, a read-only memory (ROM), a hard disk, and a flash memory. One or more computer program instructions may be stored on the computer readable storage medium. The processor 111 may execute the program instruction to implement the data transmission method according to various embodiments of this disclosure that are described above and/or other desired functions. Various contents such as a physical parameter, transmission duration of data to be transmitted, and a correspondence between identification information and a duration threshold may also be stored in the computer readable storage medium.

In an example, the electronic device 11 may further include an input means 113 and an output means 114. These components are connected to each other through a bus system and/or another form of connection mechanism (not shown).

In addition, the input means 113 may further include, for example, a keyboard and a mouse.

The output means 114 may output various information to the outside, including the data to be transmitted and the like. The output means 114 may include, for example, a display, a speaker, a printer, a communication network, and a remote output device connected by the communication network.

Certainly, for simplicity, FIG. 11 shows only some of components in the electronic device 11 that are related to this disclosure, and components such as a bus and an input/output interface are omitted. In addition, according to specific application situations, the electronic device 11 may further include any other appropriate components.

Exemplary Computer Program Product and Computer Readable Storage Medium

In addition to the foregoing method and device, the embodiments of this disclosure may also relate to a computer program product, which includes computer program instructions. When the computer program instructions are run by a processor, the processor is enabled to perform the steps of the data transmission method according to the embodiments of this disclosure, that are described in the "exemplary method" section of this specification.

The computer program product may be program code, written with one or any combination of a plurality of programming languages, that is configured to perform the operations in the embodiments of this disclosure. The programming languages include an object-oriented programming language such as Java or C++, and further include a conventional procedural programming language such as a "C" language or a similar programming language. The program code may be entirely or partially executed on a user computing device, executed as an independent software package, partially executed on the user computing device and partially executed on a remote computing device, or entirely executed on the remote computing device or a server.

In addition, the embodiments of this disclosure may further relate to a computer readable storage medium with computer program instructions stored thereon. When the computer program instructions are run by the processor, the processor is enabled to perform the steps of the data transmission method according to the embodiments of this disclosure, that are described in the "exemplary method" section of this specification.

The computer readable storage medium may be one readable medium or any combination of a plurality of readable media. The readable medium may be a readable signal medium or a readable storage medium. The readable storage medium may include, for example, but is not limited to electricity, magnetism, light, electromagnetism, infrared ray, or a semiconductor system, an apparatus, or a device, or any combination of the above. More specific examples (a non-exhaustive list) of the readable storage medium include: an electrical connection with one or more conducting wires, a portable disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination of the above.

Basic principles of this disclosure are described above in combination with specific embodiments. However, it should be apparent that the advantages, superiorities, and effects mentioned in this disclosure are merely examples but are not for limitation, and it cannot be considered that these advantages, superiorities, and effects are necessary for each embodiment of this disclosure. In addition, specific details described above are merely for examples and for ease of understanding, rather than limitations. The details described above do not limit that this disclosure must be implemented by using the foregoing specific details.

A person skilled in the art may make various modifications and variations to this disclosure without departing from the spirit and the scope of this application. In this way, if these modifications and variations of this application fall within the scope of the claims and equivalent technologies of the claims of this disclosure, this disclosure also intends to include these modifications and variations.

What is claimed is:

1. A data transmission method, comprising:

determining, by a processor, a transmission duration required for transmitting data to be transmitted between a first processing unit and a second processing unit;

starting, by the processor, timing when it is detected that the data to be transmitted is transmitted from the first processing unit;

determining, by the processor, based on timing duration and a transmission status of the data to be transmitted, a physical parameter of the first processing unit when transmitting the data to be transmitted; and transmitting, by the processor via the first processing unit, the data to be transmitted to the second processing unit based on the physical parameter.

2. The method according to claim 1, wherein the physical parameter comprises a parameter for controlling a transmission speed of the data to be transmitted.

3. The method according to claim 1, wherein the determining, by the processor, based on timing duration and a transmission status of the data to be transmitted, a physical parameter of the first processing unit when transmitting the data to be transmitted comprises:

determining timing duration by using a timing device triggered when timing is started;

determining the transmission status of the data to be transmitted by reading a status bit corresponding to the transmission status cached in a first register; and determining, based on the timing duration, the physical parameter of the first processing unit when transmitting the data to be transmitted, when the status bit corresponding to the transmission status indicates that the data to be transmitted is in transmission.

4. The method according to claim 3, wherein when the timing device comprises a time-meter, the determining timing duration by using a timing device triggered when timing is started comprises:

determining the timing duration by periodically reading timing information of the time-meter; and the determining, based on the timing duration, the physical parameter of the first processing unit when transmitting the data to be transmitted comprises:

comparing the timing duration with the transmission duration;

when the timing duration is greater than the transmission duration, determining a duration threshold corresponding to the data to be transmitted based on a correspondence between identification information stored in a second register and a duration threshold and identification information of the data to be transmitted, wherein the identification information comprises at least one of the following: an address, a data identifier (DID), and a transmission channel; and when a difference between the timing duration and the transmission duration is not less than the duration threshold corresponding to the data to be transmitted, determining the physical parameter of the first processing unit when transmitting the data to be transmitted.

5. The method according to claim 3, wherein when the timing device comprises an intervalometer, the determining timing duration by using a timing device triggered when timing is started comprises:

determining the timing duration by reading timing information generated by the intervalometer, wherein the intervalometer is configured to generate the timing information when a difference between current time and trigger time reaches warning duration, wherein the warning duration is greater than the transmission duration.

6. The method according to claim 3, wherein the determining a physical parameter of the first processing unit when transmitting the data to be transmitted comprises:

determining identification information of the first processing unit when transmitting the data to be transmitted, wherein the identification information comprises at least one of the following: an address, a data identifier (DID), and a transmission channel;

determining a type and an adjustment magnitude of the physical parameter that currently needs to be adjusted based on the identification information and correspondences between the identification information stored in a third register and the respective type and the adjustment magnitude of the physical parameter that currently needs to be adjusted; and determining, based on the type and the adjustment magnitude of the physical parameter that currently needs to be adjusted, the physical parameter of the first processing unit when transmitting the data to be transmitted.

7. The method according to claim 6, wherein the determining, based on the type and the adjustment magnitude of the physical parameter that currently needs to be adjusted, the physical parameter of the first processing unit when transmitting the data to be transmitted comprises:

when the type of the physical parameter that currently needs to be adjusted comprises a priority, determining an adjusted priority based on a current priority of the data to be transmitted and the adjustment magnitude;

assigning a corresponding priority identifier to the data to be transmitted based on the adjusted priority, or caching the data to be transmitted into a transmission queue corresponding to the adjusted priority; or when the type of the physical parameter that currently needs to be adjusted comprises a transmission bandwidth, determining an adjusted physical bandwidth based on a current physical bandwidth of the data to be transmitted and the adjustment magnitude; or when the type of the physical parameter that currently needs to be adjusted comprises a operating frequency, determining an adjusted operating frequency based on a current operating frequency and the adjustment magnitude.

8. The method according to claim 3, wherein the determining a physical parameter of the first processing unit when transmitting the data to be transmitted comprises:

determining a number of adjustment for the physical parameter by reading count information of a counter, wherein the counter is configured to count a number of adjustment made to the physical parameter; and when the number of adjustment is less than a number threshold corresponding to the data to be transmitted, determining the physical parameter of the first processing unit when transmitting the data to be transmitted.

9. A non-transitory computer readable storage medium with a computer program stored thereon, wherein the computer program is used for implementing the following steps:

determining a transmission duration required for transmitting data to be transmitted between a first processing unit and a second processing unit;

starting timing when it is detected that the data to be transmitted is transmitted from the first processing unit;

determining, based on timing duration and a transmission status of the data to be transmitted, a physical parameter of the first processing unit when transmitting the data to be transmitted; and transmitting the data to be transmitted to the second processing unit based on the physical parameter.

10. The non-transitory computer readable storage medium according to claim 9, wherein the physical parameter comprises a parameter for controlling a transmission speed of the data to be transmitted.

11. The non-transitory computer readable storage medium according to claim 9, wherein the determining, based on timing duration and a transmission status of the data to be transmitted, a physical parameter of the first processing unit when transmitting the data to be transmitted comprises:

determining timing duration by using a timing device triggered when timing is started;

determining the transmission status of the data to be transmitted by reading a status bit corresponding to the transmission status cached in a first register; and determining, based on the timing duration, the physical parameter of the first processing unit when transmitting the data to be transmitted, when the status bit corresponding to the transmission status indicates that the data to be transmitted is in transmission.

12. The non-transitory computer readable storage medium according to claim 11, wherein when the timing device comprises a time-meter, the determining timing duration by using a timing device triggered when timing is started comprises:

determining the timing duration by periodically reading timing information of the time-meter; and the determining, based on the timing duration, the physical parameter of the first processing unit when transmitting the data to be transmitted comprises:

comparing the timing duration with the transmission duration;

when the timing duration is greater than the transmission duration, determining a duration threshold corresponding to the data to be transmitted based on a correspondence between identification information stored in a second register and a duration threshold and identification information of the data to be transmitted, wherein the identification information comprises at least one of the following: an address, a data identifier (DID), and a transmission channel; and when a difference between the timing duration and the transmission duration is not less than the duration threshold corresponding to the data to be transmitted, determining the physical parameter of the first processing unit when transmitting the data to be transmitted.

13. An electronic device, wherein the electronic device comprises:

a processor; and a memory, configured to store processor-executable instructions, wherein the processor is configured to read the executable instructions from the memory, and execute the executable instructions to implement the following steps:

determining a transmission duration required for transmitting data to be transmitted between a first processing unit and a second processing unit;

starting timing when it is detected that the data to be transmitted is transmitted from the first processing unit;

determining, based on timing duration and a transmission status of the data to be transmitted, a physical parameter of the first processing unit when transmitting the data to be transmitted; and transmitting the data to be transmitted to the second processing unit based on the physical parameter.

14. The electronic device according to claim 13, wherein the physical parameter comprises a parameter for controlling a transmission speed of the data to be transmitted.

15. The electronic device according to claim 13, wherein the determining, based on timing duration and a transmission status of the data to be transmitted, a physical parameter of the first processing unit when transmitting the data to be transmitted comprises:

determining timing duration by using a timing device triggered when timing is started;

determining the transmission status of the data to be transmitted by reading a status bit corresponding to the transmission status cached in a first register; and determining, based on the timing duration, the physical parameter of the first processing unit when transmitting the data to be transmitted, when the status bit corresponding to the transmission status indicates that the data to be transmitted is in transmission.

16. The electronic device according to claim 15, wherein when the timing device comprises a time-meter, the determining timing duration by using a timing device triggered when timing is started comprises:

determining the timing duration by periodically reading timing information of the time-meter; and the determining, based on the timing duration, the physical parameter of the first processing unit when transmitting the data to be transmitted comprises:

comparing the timing duration with the transmission duration;

when the timing duration is greater than the transmission duration, determining a duration threshold corresponding to the data to be transmitted based on a correspondence between identification information stored in a second register and a duration threshold and identification information of the data to be transmitted, wherein the identification information comprises at least one of the following: an address, a data identifier (DID), and a transmission channel; and when a difference between the timing duration and the transmission duration is not less than the duration threshold corresponding to the data to be transmitted, determining the physical parameter of the first processing unit when transmitting the data to be transmitted.

17. The electronic device according to claim 15, wherein when the timing device comprises an intervalometer, the determining timing duration by using a timing device triggered when timing is started comprises:

determining the timing duration by reading timing information generated by the intervalometer, wherein the intervalometer is configured to generate the timing information when a difference between current time and trigger time reaches warning duration, wherein the warning duration is greater than the transmission duration.

18. The electronic device according to claim 15, wherein the determining a physical parameter of the first processing unit when transmitting the data to be transmitted comprises:

determining identification information of the first processing unit when transmitting the data to be transmitted, wherein the identification information comprises at least one of the following: an address, a data identifier (DID), and a transmission channel;

determining a type and an adjustment magnitude of the physical parameter that currently needs to be adjusted based on the identification information and correspondences between the identification information stored in a third register and the respective type and the adjustment magnitude of the physical parameter that currently needs to be adjusted; and determining, based on the type and the adjustment magnitude of the physical parameter that currently needs to be adjusted, the physical parameter of the first processing unit when transmitting the data to be transmitted.

19. The electronic device according to claim 18, wherein the determining, based on the type and the adjustment magnitude of the physical parameter that currently needs to be adjusted, the physical parameter of the first processing unit when transmitting the data to be transmitted comprises:

when the type of the physical parameter that currently needs to be adjusted comprises a priority, determining an adjusted priority based on a current priority of the data to be transmitted and the adjustment magnitude;

assigning a corresponding priority identifier to the data to be transmitted based on the adjusted priority, or caching the data to be transmitted into a transmission queue corresponding to the adjusted priority; or when the type of the physical parameter that currently needs to be adjusted comprises a transmission bandwidth, determining an adjusted physical bandwidth based on a current physical bandwidth of the data to be transmitted and the adjustment magnitude; or when the type of the physical parameter that currently needs to be adjusted comprises a operating frequency, determining an adjusted operating frequency based on a current operating frequency and the adjustment magnitude.

20. The electronic device according to claim 15, wherein the determining a physical parameter of the first processing unit when transmitting the data to be transmitted comprises:

determining a number of adjustment for the physical parameter by reading count information of a counter, wherein the counter is configured to count a number of adjustment made to the physical parameter; and when the number of adjustment is less than a number threshold corresponding to the data to be transmitted, determining the physical parameter of the first processing unit when transmitting the data to be transmitted.

* * * * *